United States Patent

[11] 3,582,672

| [72] | Inventor | Malcolm George Palmer<br>Blakedown, near Kidderminster, England |
|---|---|---|
| [21] | Appl. No. | 820,498 |
| [22] | Filed | Apr. 30, 1969 |
| [45] | Patented | June 1, 1971 |
| [73] | Assignee | Albright & Wilson Limited<br>Birmingham, England |
| [32] | Priority | May 20, 1968 |
| [33] | | Great Britain |
| [31] | | 24030/68 |

[54] PYROTECHNIC DEVICES
11 Claims, 1 Drawing Fig.

[52] U.S. Cl. .................................................. 307/118,
73/300, 102/7, 102/19.2, 102/70.2, 200/81.6,
200/152
[51] Int. Cl. ...................................................... H01L 35/24,
H01h 29/28
[50] Field of Search ......................................... 200/81.6,
61.05, 152.4, 152.9; 307/118; 73/307, 300, 301;
102/7, 19.2, 70.2; 340/421

[56] References Cited
UNITED STATES PATENTS

| 2,198,351 | 4/1940 | Thielers et al. | 200/152.9(X) |
|---|---|---|---|
| 3,108,476 | 10/1963 | Koelle | 200/152.4(X) |
| 3,198,118 | 8/1965 | Lorenz | 200/152.9(X) |
| 1,311,781 | 7/1919 | Straub et al. | 102/70.2UX |
| 3,128,704 | 4/1964 | Noddin et al. | 102/7X |
| 3,271,543 | 9/1966 | Schonfeld et al. | 200/81.6 |

Primary Examiner—Robert K. Schaefer
Assistant Examiner—William J. Smith
Attorney—Herbert H. Goodman

ABSTRACT: Electrical pressure switches for submarine use comprise two terminals set inside a capillary tube closed at one end and connected through the tube to an external circuit, which preferably comprises an amplifier. On submergence water reaches the terminals and closes the switch at a given depth, determined by the position of the terminals in the tube.

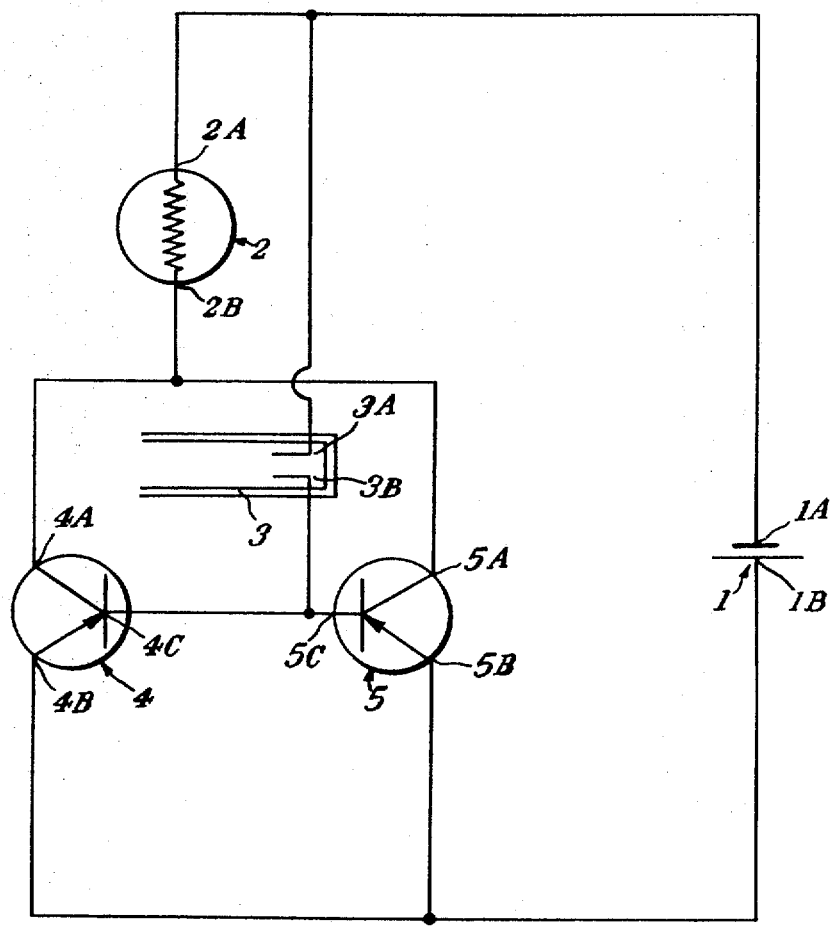

PYROTECHNIC DEVICES

This invention relates to electrical pressure switches for use in a sea water environment, and can be used with especial advantage in submarine-signalling devices.

Conventional electrical pressure switches comprise two conducting terminals which may be forced together by an external pressure acting through an elastic barrier such as a flexible diaphragm in contact with one of the terminals.

Pressure switches find a particular use in submarine-signalling devices which normally comprise a detonator and a battery which are electrically connected in series via a pressure switch set to close when the device reaches a predetermined depth of water, thereby activating the circuit and exploding the detonator.

However, a simple detonation device consisting only of a battery, a detonator and a pressure switch, would suffer from the disadvantage that any accidental closure of the pressure switch terminals, for instance because of a mechanical shock, might cause a dangerous explosion. For this reason it is desirable for submarine-signalling devices to comprise a means of ensuring that detonation can never occur until the device is submerged in water. It has been proposed to introduce this safeguard by providing as the battery a sea cell, that is an electrolytic cell which emits a current only when immersed in water. However, sea cells may have discharge characteristics undesirable for firing a detonator and also generally contain silver or a silver compound as an electrode, thus adding to the cost of the apparatus.

We have now invented a pressure switch of improved reliability which will not conduct a current except when immersed in water. The incorporation of such a novel pressure switch in a submarine-signalling device therefore makes it possible to dispense with a sea cell battery or other component safeguarding the device against out-of-water detonation.

Accordingly, the present invention provides a pressure switch for submarine use which comprises a capillary tube closed at one end and containing at side intermediate point along its inside length two electric terminals connectable to a circuit outside the tube. Owing to the small space available in the capillary tube, contacts must be small in area and are therefore capable of passing only a small current with the type of power source likely to be used. It is therefore usually necessary to connect the switch to a current amplifier and this will be assumed in the following descriptions.

The invention also provides a submarine-signalling device comprising a novel pressure switch as herein described.

The mode of operation of the novel pressure switch is substantially as follows. The switch is connected in an appropriate manner to the electrical circuit of a submarine-signalling device comprising a battery and a detonator and the device is immersed in the sea. Sea water will then tend to enter the capillary tube from the open end, compressing the air trapped within. As the depth of immersion and hence the pressure in the tube increases, sea water will gradually travel along the tube towards the closed end. When a given depth is reached the liquid will just reach the terminals inside the tube, so providing an electrical connection between them and allowing the passage of a small current through the switch. This current is amplified by the means comprised in the switch so as to cause a much larger current, sufficient for detonation, to flow through the electrical circuit in the rest of the device.

The arrival of liquid at the terminals inside the capillary tube thus constitutes closure of the pressure switch. The position of the terminals in the tube, that is the length of tube between the open end and the terminals are selected so as to enable closure to take place at any required depth. The terminals are sealed through the walls of the capillary tube so as to be capable of external connection.

The width of the capillary tube is sufficiently narrow to prevent air from escaping on immersion of the switch in water. It has been found convenient to use capillary tubes of between 1 and 2 mm. internal diameter.

The material of construction of the capillary tube should be such as to render the tube robust enough to withstand the pressures at the envisaged submarine operating depths without deformation. Equally, the tube should preferably not be liable to deformation or deterioration during storage. We have found it convenient to use capillary tubes of glass, but many plastic, ceramic or metallic substitutes can be envisaged.

The nature, dimensions and clearance of the electrode terminals within the capillary tube are chosen according to the current they are required to pass. Normally, in order to maximize this current, it will be desired to provide the terminals with as large a functional area as possible within the confines of a capillary tube, and to have as narrow a clearance between them as is compatible with safety and the correct functioning of the device. The potential drop between the electrode terminals and the electrolyte solution should also be kept to a minimum by a suitable choice of the materials of construction. We prefer for this purpose to employ an anodic terminal of magnesium or a magnesium containing alloy and to construct the cathode, or at least the surface thereof, of a metal having a low hydrogen overvoltage, such as silver or nickel.

The means of current amplification may be transistorized amplification device appropriately connected to the capillary tube terminals and with provision for connection to an external circuit in such a way as to give the amplification effect required. The preferred means of amplification is included in the preferred embodiment of the submarine signalling device of the invention which is now described with reference to the accompanying drawing, which is a circuit diagram. The apparatus represented by the drawing comprises a battery 1 the negative terminal 1A of which is connected to a terminal 2A of a detonator 2. The line 1A–2A is connected to a silver terminal 3A which is one of a pair of terminals 3A and 3B set through the walls of a capillary tube 3 having one open end. The terminal 3B is of magnesium and is connected to the base circuit terminals 4C and 5C of two PNP-type transistors 4 and 5 which also have terminals 4A and 4B and 5A and 5B through which they are connected in parallel between the second terminal 2B of the detonator and the positive terminal 1B of the battery. 4A and 5A are collector terminals and are connected to 2B; 4B and 5B are emitter terminals and are connected to 1B.

Under normal conditions the terminals 3A and 3B will be isolated from each other and the base circuits of the transistors 4 and 5 will be open. A small, constant current will flow through the detonator via the collector circuits of the transistors (2B–4A–4B–1B–1A–2A) and (2B–5A–5B–1B–1A–2A) but this may be extremely small and insufficient either to explode the detonator or to appreciably weaken the battery over a considerable period.

On immersion of the system in the sea, water will enter the tube 3 and at suitable depth will reach the terminals 3A and 3B so providing an electrical connection between them. A small current will then flow between 3A and 3B and through the base circuits of the transistor (1A–3A–3B–4C–4B–1B), and (1A–3A–3B–5C–5B–1B). By virtue of the amplifying properties of transistors this small base current will cause very much greater currents to flow through the two collector circuits comprising the detonator which then explodes. The power of the battery and the number of transistors used in the preferred embodiment of the invention may be varied for convenience and according to the detonation current required.

The transistors used in the above embodiment of the invention are the medium power PNP-type OC76 sold by the Mullard Company. It is also possible to replace these by a single PNP transistor connected similarly, e.g. a Mullard ACY 18 or ACY 20 transistor, or, alternatively, to use NPN transistors in which case the direction of the current and the positions of the terminals 3A and 3B in the circuit need to be reversed. The use of solid-state amplifiers makes for a specially robust pressure switch which is not readily damaged by vibration or mechanical shock.

The invention thus provides a novel submarine-signalling device of improved safety, simplicity and ease of construction. A particular advantage in the last respect is the possibility of substituting a standard-type battery, e.g. a dry cell Leclanche-type battery, for the relatively expensive and less readily available sea cell.

We claim:

1. A pressure switch for submarine use comprising,
   a capillary tube having a narrow bore, a closed end and an open end,
   two electric terminals positioned within said bore a predetermined distance from said open end, each of said electric terminals being spaced adjacent but out of contact with the other,
   said electric terminals being adapted to be connected to an electric circuit external of said tube,
   said bore containing air and being sufficiently narrow to prevent the escape of the air from said bore when the same is immersed in sea water so that the sea water enters said bore a distance proportional to the pressure of the sea water on the air in said bore which is dependent upon the depth of immersion of said switch in the sea,
   whereby when said electric terminals are connected to an external electric circuit so that when said switch is immersed in sea water to a depth such that the sea water penetrates said bore and contacts said electric terminals, said electric circuit external of said tube is completed.

2. A pressure switch as claimed in claim 1 wherein one of said electric terminals is magnesium and the other of said electric terminals is selected from the group consisting of silver and nickel.

3. A pressure switch as claimed in claim 2 wherein the internal diameter of said bore is from about 1 to 2 mm.

4. A pressure switch as claimed in claim 1 which further comprises, in an electrical circuit connected to the terminals outside the tube, a current amplification means.

5. A pressure switch as claimed in claim 4 wherein the current amplification means is transistorized 6. A pressure switch as claimed in claim 1 wherein the internal diameter of said bore is from 1 to 2 mm.

7. A pressure switch as claimed in claim 6 wherein one of said electric terminals is anodic and wherein said anodic terminal is of a material selected from the group consisting of magnesium and high magnesium alloys.

8. A pressure switch as claimed in claim 7 wherein one of said electric terminals is cathodic and wherein said cathodic terminal is of a material selected from the group consisting of silver and nickel.

9. A submarine-signalling device comprising in combination a battery, a detonator, a pressure switch, and an amplifier,
   said battery, detonator and amplifier being connected in a series circuit whereby a small amount of current insufficient to activate said detonator flows through said circuit, said pressure switch being connected in parallel across said detonator and said amplifier,
   said pressure switch comprising
      a capillary tube having a narrow bore, a closed end and an open end,
      two electric terminals positioned within said bore a predetermined distance from said open end, each of said electric terminals being spaced adjacent but out of contact with the other,
      said electric terminals being connected across said detonator and amplifier,
      said bore containing air and being sufficiently narrow to prevent the escape of the air from said bore when the same is immersed in sea water so that the sea water enters said bore and distance proportional to the pressure of the sea water on the air in said bore which is dependent upon the depth of immersion of said switch in the sea,
      said predetermined distance being the distance that sea water will penetrate said bore when said switch is immersed to a predetermined depth below the level of the sea,
   whereby when said submarine-signalling device is immersed in sea water to said predetermined depth the sea water penetrates said bore said predetermined distance and contacts and electrically connects said electrical terminals of said pressure switch thereby completing the electrical connection across said detonator and said amplifier which results in the passage of an amount of current through said detonator sufficient to activate said detonator.

10. A submarine-signalling device as claimed in claim 9 wherein the internal diameter of said bore is from about 1 to 2 mm. and wherein said amplifier is a transistor amplifier.

11. A submarine-signalling device as claimed in claim 10 wherein in said pressure switch one of said electric terminals is magnesium and the other of said electric terminals is selected from the group consisting of silver and nickel.

UNITED STATES PATENT OFFICE
CERTIFICATE OF CORRECTION

Patent No. 3,582,672          Dated June 1, 1971

Inventor(s) MALCOLM GEORGE PALMER

It is certified that error appears in the above-identified patent and that said Letters Patent are hereby corrected as shown below:

Column 4, line 22, "and" should be --a--.

Signed and sealed this 16th day of November 1971.

(SEAL)
Attest:

EDWARD M. FLETCHER, JR.          ROBERT GOTTSCHALK
Attesting Officer                Acting Commissioner of Patent